US011739835B2

(12) United States Patent
Akiyoshi et al.

(10) Patent No.: US 11,739,835 B2
(45) Date of Patent: Aug. 29, 2023

(54) CONTROL DEVICE AND CONTROL METHOD OF CONTINUOUSLY VARIABLE TRANSMISSION

(71) Applicant: Honda Motor Co., Ltd., Tokyo (JP)

(72) Inventors: Norihiro Akiyoshi, Tokyo (JP); Kohei Sakai, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 53 days.

(21) Appl. No.: 17/680,261

(22) Filed: Feb. 24, 2022

(65) Prior Publication Data

US 2022/0381338 A1    Dec. 1, 2022

(30) Foreign Application Priority Data

Apr. 21, 2021 (JP) ................... 2021-072212

(51) Int. Cl.
*F16H 61/662* (2006.01)
*F16H 61/66* (2006.01)

(52) U.S. Cl.
CPC . *F16H 61/66272* (2013.01); *F16H 61/66259* (2013.01); *F16H 2061/6608* (2013.01); *F16H 2061/66218* (2013.01)

(58) Field of Classification Search
CPC ......... F16H 61/66272; F16H 61/66259; F16H 61/662; F16H 2059/683; F16H 2061/66277; F16H 2061/66218; F16H 2061/6608
USPC .......................................................... 474/28
See application file for complete search history.

(56) References Cited

U.S. PATENT DOCUMENTS

| | | | | |
|---|---|---|---|---|
| 4,702,725 A | * | 10/1987 | Kouno | F16H 61/66259 474/18 |
| 5,924,955 A | * | 7/1999 | Ishii | F16H 61/66259 477/48 |
| 6,142,908 A | * | 11/2000 | Kidokoro | F16H 61/6648 701/61 |

(Continued)

FOREIGN PATENT DOCUMENTS

| | | |
|---|---|---|
| JP | 3821764 | 9/2006 |
| JP | 2010078024 | 4/2010 |

(Continued)

OTHER PUBLICATIONS

"Office Action of Japan Counterpart Application", dated Dec. 6, 2022, with English translation thereof, pp. 1-4.

*Primary Examiner* — Henry Y Liu

(74) *Attorney, Agent, or Firm* — JCIPRNET

(57) ABSTRACT

Disclosed is lateral pressure control of a continuously variable transmission (CVT) with a transmission ratio changed by changing groove widths of a drive pulley and a driven pulley, a drive force from a drive source being transmitted to a wheel. A control part controlling respective lateral pressures of the drive pulley and the driven pulley is provided. The control part sets an increase correction amount of the lateral pressure of the drive pulley to a first lateral pressure increase correction amount if the CVT is not in an in-gear state or a shift position is consistent with a traveling direction of the vehicle, and, sets said amount to a second lateral pressure increase correction amount smaller than the first lateral pressure increase correction amount if the CVT is in the in-gear state and the shift position is not consistent with the traveling direction of the vehicle.

6 Claims, 10 Drawing Sheets

(56) References Cited

U.S. PATENT DOCUMENTS

| | | | | |
|---|---|---|---|---|
| 6,542,803 B1* | 4/2003 | Vorndran | F16H 61/66254 | 701/68 |
| 7,169,070 B2* | 1/2007 | Jozaki | F16H 61/66259 | 474/18 |
| 7,222,005 B2* | 5/2007 | Kang | F16H 61/12 | 474/18 |
| 7,229,372 B2* | 6/2007 | Shimanaka | F16H 61/66272 | 474/18 |
| 7,387,589 B2* | 6/2008 | Suzuki | F16H 61/66254 | 474/18 |
| 7,402,118 B2* | 7/2008 | Kimura | F16H 61/66254 | 474/18 |
| 7,699,729 B2* | 4/2010 | Inoue | F16H 61/66259 | 474/18 |
| 7,715,967 B2* | 5/2010 | Kim | F16H 61/30 | 701/53 |
| 7,789,780 B2* | 9/2010 | Iwasa | F16H 59/70 | 474/18 |
| 7,806,791 B2* | 10/2010 | Izumi | F16H 61/66272 | 474/18 |
| 7,922,610 B2* | 4/2011 | Nihei | F16H 61/0021 | 474/18 |
| 8,157,681 B2* | 4/2012 | Iwasa | F16H 61/66259 | 474/28 |
| 8,914,201 B2* | 12/2014 | Doihara | F16H 61/66272 | 477/45 |
| 8,914,203 B2* | 12/2014 | Kodama | F16H 61/66272 | 477/45 |
| 10,527,166 B1* | 1/2020 | Hwang | F16H 61/0021 | |
| 2004/0063525 A1 | 4/2004 | Ochiai | F16H 57/0434 | 474/18 |
| 2004/0128046 A1* | 7/2004 | Yamamoto | B60W 10/04 | 701/64 |
| 2004/0128048 A1* | 7/2004 | Iwatuki | B60W 10/04 | 477/37 |
| 2004/0209719 A1* | 10/2004 | Ochiai | B60W 10/04 | 474/18 |
| 2005/0070402 A1* | 3/2005 | Kimura | F16H 61/66254 | 477/46 |
| 2005/0192131 A1* | 9/2005 | Yamamoto | F16H 61/66272 | 474/18 |
| 2005/0221929 A1* | 10/2005 | Oshita | B60W 10/107 | 474/18 |
| 2005/0221930 A1* | 10/2005 | Oshita | F16H 61/12 | 474/18 |
| 2006/0069486 A1* | 3/2006 | Yamaguchi | F16H 61/66259 | 701/56 |
| 2006/0073924 A1* | 4/2006 | Izumi | F16H 61/66254 | 474/18 |
| 2006/0079356 A1* | 4/2006 | Kodama | F16H 61/66272 | 474/18 |
| 2006/0194671 A1* | 8/2006 | Katou | F16H 61/66272 | 477/46 |
| 2006/0229156 A1* | 10/2006 | Suzuki | F16H 61/66259 | 477/37 |
| 2007/0082770 A1* | 4/2007 | Nihei | F16H 61/66259 | 474/18 |
| 2007/0082771 A1* | 4/2007 | Izumi | F16H 61/66272 | 474/18 |
| 2007/0087874 A1* | 4/2007 | Kobayashi | F16H 61/66259 | 474/18 |
| 2007/0197320 A1* | 8/2007 | Kimura | F16H 61/66259 | 474/18 |
| 2007/0219048 A1* | 9/2007 | Yamaguchi | F16H 61/66259 | 477/109 |
| 2008/0153636 A1* | 6/2008 | Inoue | F16H 61/66272 | 474/70 |
| 2009/0298625 A1* | 12/2009 | Kodama | F16H 61/66259 | 474/11 |
| 2010/0248886 A1* | 9/2010 | Jozaki | F16H 61/702 | 475/210 |
| 2010/0248895 A1* | 9/2010 | Jozaki | F16H 61/702 | 477/44 |
| 2011/0218718 A1* | 9/2011 | Hattori | F16H 61/66259 | 701/51 |
| 2011/0230285 A1* | 9/2011 | Hinami | F16H 61/0021 | 474/28 |
| 2012/0083977 A1* | 4/2012 | Tanaka | F16H 61/66259 | 701/55 |
| 2012/0108373 A1* | 5/2012 | Doihara | F16H 61/66272 | 474/28 |
| 2012/0108374 A1* | 5/2012 | Doihara | F16H 61/66272 | 474/28 |
| 2012/0135829 A1* | 5/2012 | Doihara | F16H 61/66272 | 474/28 |
| 2012/0245807 A1* | 9/2012 | Kurahashi | F16H 61/66259 | 474/11 |
| 2013/0138310 A1* | 5/2013 | Kushiyama | F16H 61/66272 | 701/60 |
| 2014/0274505 A1* | 9/2014 | Kinoshita | F16H 61/12 | 474/28 |
| 2015/0081181 A1* | 3/2015 | Takahashi | F16H 61/66272 | 701/51 |
| 2015/0148156 A1* | 5/2015 | Yasui | F16H 61/66231 | 474/11 |
| 2015/0148157 A1* | 5/2015 | Takahashi | F16H 61/66272 | 474/23 |
| 2015/0152962 A1* | 6/2015 | Ajimoto | F16H 61/6648 | 477/37 |
| 2016/0025161 A1* | 1/2016 | Matsuo | F16D 48/062 | 192/48.5 |
| 2016/0201798 A1* | 7/2016 | Kikkawa | F16H 61/662 | 477/44 |
| 2016/0258531 A1* | 9/2016 | Ito | F16H 61/662 | |
| 2017/0159729 A1* | 6/2017 | Sakamoto | F16D 48/066 | |
| 2018/0073634 A1* | 3/2018 | Suwabe | F16H 61/662 | |
| 2018/0106367 A1* | 4/2018 | Mouri | B60W 10/06 | |
| 2018/0245691 A1* | 8/2018 | Kawamoto | F16H 61/0021 | |
| 2019/0048898 A1* | 2/2019 | Harada | F16H 61/0031 | |
| 2019/0093764 A1* | 3/2019 | Okahara | F16H 61/0202 | |
| 2019/0128414 A1* | 5/2019 | Mallela | F16H 57/0006 | |
| 2019/0154145 A1* | 5/2019 | Hwang | F16H 61/662 | |
| 2019/0225222 A1* | 7/2019 | Nishihiro | F16H 63/46 | |
| 2019/0242474 A1* | 8/2019 | Terai | B60W 10/107 | |
| 2019/0249774 A1* | 8/2019 | Ikeda | F16H 59/40 | |
| 2019/0293173 A1* | 9/2019 | Suzumura | F16H 37/0846 | |
| 2019/0293176 A1* | 9/2019 | Hwang | F16H 9/125 | |
| 2020/0256463 A1* | 8/2020 | Ishii | F16H 61/0202 | |
| 2020/0298829 A1* | 9/2020 | Inoue | B60W 20/20 | |
| 2020/0298830 A1* | 9/2020 | Inoue | B60K 7/0007 | |
| 2020/0318736 A1* | 10/2020 | Oota | B60W 10/101 | |
| 2021/0034074 A1* | 2/2021 | Hiasa | B60W 30/1882 | |
| 2021/0123526 A1* | 4/2021 | Inoue | B60K 6/387 | |
| 2021/0254711 A1* | 8/2021 | Akebono | F16H 61/66259 | |
| 2021/0324954 A1* | 10/2021 | Lim | F16H 61/08 | |
| 2022/0055601 A1* | 2/2022 | Lee | F16H 59/18 | |

FOREIGN PATENT DOCUMENTS

| | | |
|---|---|---|
| JP | 5480227 | 4/2014 |
| JP | 2015135141 | 7/2015 |
| WO | 2021059636 | 4/2021 |

* cited by examiner

CONTROL DEVICE AND CONTROL METHOD OF CONTINUOUSLY VARIABLE TRANSMISSION

CROSS-REFERENCE TO RELATED APPLICATION

This application claims the priority benefit of Japan application serial no. 2021-072212 filed on Apr. 21, 2021. The entirety of the above-mentioned patent application is hereby incorporated by reference herein and made a part of this specification.

BACKGROUND

Technical Field

The invention relates to a control device and a control method which controls a lateral pressure of a pulley in a continuously variable transmission including a configuration in which a belt is wound on a drive (primary) pulley and a driven (secondary) pulley.

Description of Related Art

In a vehicle in which a belt-type continuously variable transmission (CVT) is mounted, various solutions have been proposed to prevent the durability from deteriorating due to belt slippage. For example, in the power transmission device disclosed in Patent Document 1, belt slippage is prevented by adjusting a clutch transmission torque so that a clutch of a forward/backward switching mechanism provided between a drive source and the CVT slips before the belt of the CVT slips, that is, belt slippage is prevented by functioning as a torque fuse. In the system disclosed in Patent Document 2, in the case where the vehicle moves in a direction opposite to the shift position at Drive (D) (moving forward) or Reverse (R) (moving backward), the engine output is limited or a hydraulic pressure of the primary pulley is increased to avoid belt slippage.

Patent Document 2 indicates that in the belt-type CVT, when a vehicle goes backward in a state in which neither the accelerator pedal nor the brake pedal is stepped on while the shift lever is kept at the D (Drive) range during uphill, the hydraulic pressure balance between the primary pressure and the secondary pressure is lost. As a result, the primary pressure drops, and the torque capacity (the maximum torque transmittable without causing belt slippage) decreases, and there is a possibility that a belt slip may occur. In Patent Document 2, in order to prevent such belt slippage, a means of limiting engine output or increasing the hydraulic pressure of the primary pulley is increased.

PRIOR ART DOCUMENTS

Patent Documents

1. Japanese Patent No. 5480227
2. Japanese Patent No. 3821764

However, in the case where the line pressure for supplementing the dropped hydraulic pressure of the primary pulley is maximized as in Patent Document 2, even though belt slippage can be prevented, due to the loss of the hydraulic pressure balance between the primary pulley and the secondary pulley, a desired transmission ratio cannot be maintained. In the following, an example of the case where a vehicle travels reversely during uphill is described.

As shown in FIG. 1, when a vehicle 10 in which a belt-type CVT is mounted goes uphill, if there is a vehicle in the opposite direction, for example, it is necessary to stop ((A) of FIG. 1), retreat ((B) of FIG. 1), stop at a retreated location ((C) of FIG. 1), and then restart ((D) of FIG. 1). In such case, in a normal switch-back operation, that is, an operation in which the shift position is set to N/R to retreat, the brake is stepped on at the retreated location to stop, and the shift position is switched to D from N/R to restart, the CVT ratio is kept at LOW and no problem occurs.

Differing from such switch-back operation, in the case where the brake is released while the shift position is at D (Drive) and the vehicle retreats ((B) of FIG. 1), stepping on the accelerator pedal, instead of the brake can also stop the vehicle ((C) of FIG. 1). In this case, if it is possible to restart while stepping on the accelerator pedal ((D) of FIG. 1), the change of the shift position as well as the brake operation can be omitted, and the pedal operation can be simplified, making such operation more favorable.

However, as recognized in Patent Document 2, the hydraulic pressure balance between the primary pressure and the secondary pressure is lost, the primary pressure drops, and belt slippage occurs when the vehicle retreats in a state in which the shift position is kept at D and the brake is not stepped on ((B) of FIG. 1), and the control for increasing the lateral pressure of the primary pulley is exerted to prevent such belt slippage. Therefore, when the accelerator pedal is stepped on to stop the retreating vehicle, and the accelerator pedal keeps being stepped on to restart, the transmission ratio of the CVT is deviated from LOW, and the vehicle cannot move smoothly.

When the vehicle retreats while the shift position remains at D (Drive), the hydraulic pressure balance is lost, and the primary pressure drops. Therefore, in order to prevent such belt slippage, it is necessary to increase the lateral pressure of the primary pulley. However, to stop the retreating vehicle by stepping on the accelerator pedal, instead of the brake and keep stepping on the accelerator pedal to restart, the control of increasing the lateral pressure of the primary pulley is exerted, which deviates the transmission ratio of the CVT from LOW, obstructs the vehicle from moving smoothly, and deteriorates the traveling performance.

SUMMARY

An aspect of the invention provides a control device of a continuously variable transmission in a vehicle in which the continuously variable transmission is mounted. The continuously variable transmission includes a drive pulley, a driven pulley, and a belt wound on the drive pulley and the driven pulley, a transmission ratio is changed by changing groove widths of the drive pulley and the driven pulley, and a drive force from a drive source is transmitted to a wheel. The control device has: a first lateral pressure generation circuit, generating a lateral pressure of the drive pulley; a second lateral pressure generation circuit, generating a lateral pressure of the driven pulley; and a control part controlling the first lateral pressure generation circuit and the second lateral pressure generation circuit and controlling the respective lateral pressures of the drive pulley and the driven pulley. The control part is configured to: in a case where the continuously variable transmission is not in the in-gear state and the shift position is not consistent with the traveling direction of the vehicle, set the increase correction amount of the lateral pressure of the drive pulley to a first lateral pressure increase correction amount; and in a case where the continuously variable transmission is in the in-gear state and the shift position is not consistent with the traveling direction of the vehicle, set the increase correction amount of the lateral pressure of the drive pulley to a second lateral pressure increase correction amount. The second lateral pressure increase correction amount is smaller than the first lateral pressure increase correction amount.

Another aspect of the invention provides a control method of a continuously variable transmission in a vehicle in which the continuously variable transmission is mounted. The continuously variable transmission includes a drive pulley, a driven pulley, and a belt wound on the drive pulley and the driven pulley, a transmission ratio is changed by changing groove widths of the drive pulley and the driven pulley, and a drive force from a drive source is transmitted to a wheel. The control method includes: by a control part controlling respective lateral pressures of the drive pulley and the driven pulley, detecting an in-gear state of the continuously variable transmission, a shift position, and a traveling direction of the vehicle; in a case where the continuously variable transmission is not in the in-gear state and the shift position is not consistent with the traveling direction of the vehicle, setting the increase correction amount of the lateral pressure of the drive pulley to a first lateral pressure increase correction amount; and in a case where the continuously variable transmission is in the in-gear state and the shift position is not consistent with the traveling direction of the vehicle, setting the increase correction amount of the lateral pressure of the drive pulley to a second lateral pressure increase correction amount, the second lateral pressure increase correction amount being smaller than the first lateral pressure increase correction amount.

BRIEF DESCRIPTION OF THE DRAWINGS (A) to (D) of FIG. 1 are schematic views illustrating an operational sequence of a pedal and a shift position for explaining the stoppage and restart at the time of traveling reversely during uphill.

DESCRIPTION OF THE EMBODIMENTS

Figure 1:
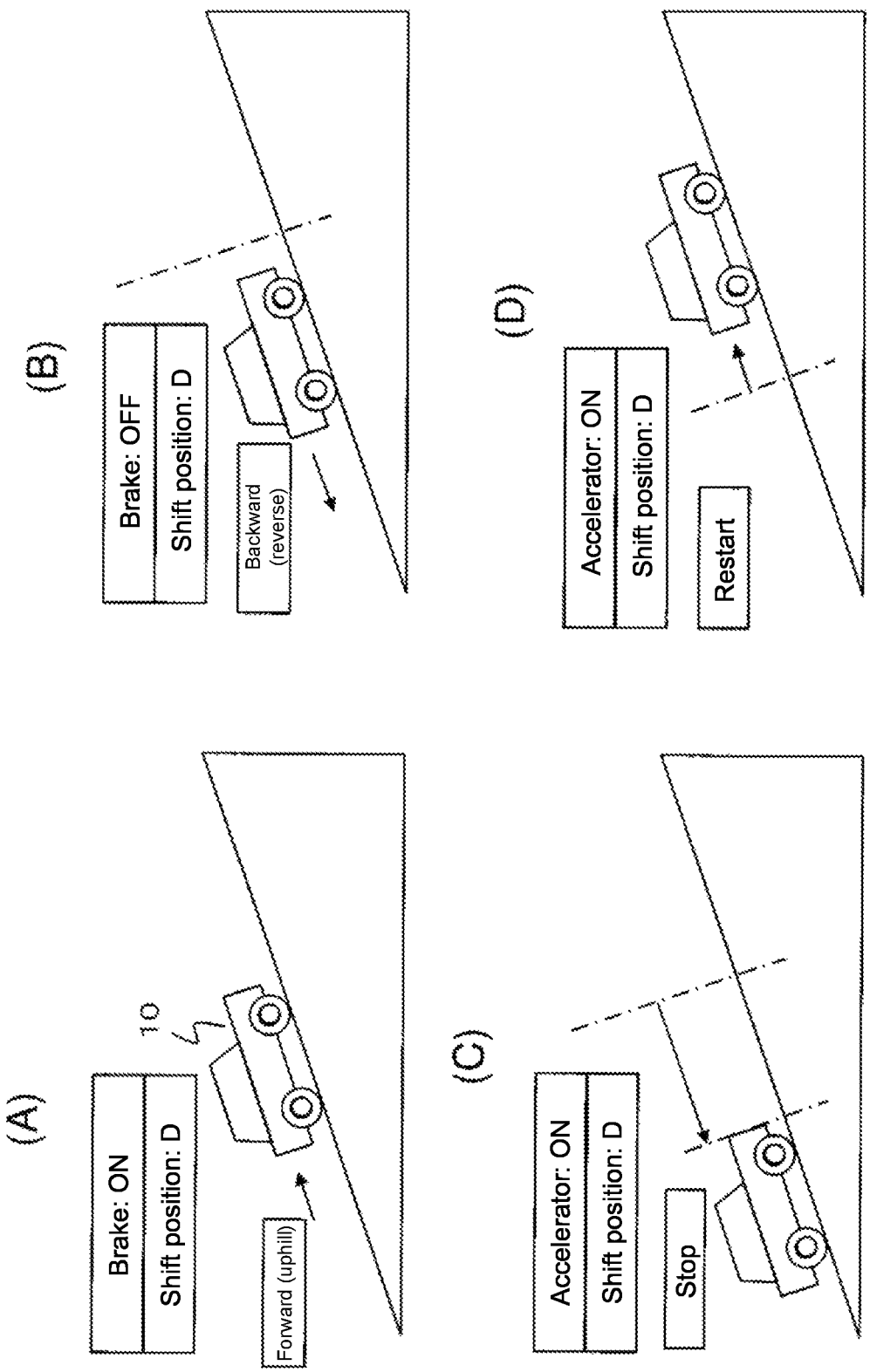

The invention provides a control device and a control method of a continuously variable transmission capable of reliably preventing belt slippage to protect the belt and preventing traveling performance from deteriorating.

According to the invention, in the case where the continuously variable transmission is not in the in-gear state and the shift position is not consistent with the traveling direction of the vehicle, the control part sets the increase correction amount of the lateral pressure of the drive pulley to the first lateral pressure increase correction amount, and in the case where the continuously variable transmission is in the in-gear state and the shift position is not consistent with the traveling direction of the vehicle, the control part sets the increase correction amount of the lateral pressure of the drive pulley to the second lateral pressure increase correction amount. The second lateral pressure increase correction amount is set to be smaller than the first lateral pressure increase correction amount. Accordingly, the pressure difference between the lateral pressure of the drive pulley and the lateral pressure of the driven pulley can be increased, the transmission ratio of the continuously variable transmission can stay at LOW, and the traveling performance at the time of restart can be prevented from being deteriorated.

The vehicle further includes a torque converter provided between an output shaft of the drive source and an input shaft of the continuously variable transmission. The control part is configured to, in the case where the continuously variable transmission is in the in-gear state and the shift position is not consistent with the traveling direction of the vehicle, calculate a rotation difference between an input side and an output side of the torque converter, and generate the second lateral pressure increase correction amount in accordance with the rotation difference. The greater the rotation difference, the greater the second lateral pressure increase correction amount can be. Accordingly, the second lateral pressure increase correction amount can decrease within the range where the foot torque variation is small, and the pressure difference between the lateral pressure of the drive pulley and the lateral pressure of the driven pulley can be efficiently increased.

The vehicle may further include a forward/backward switching mechanism provided between the torque converter and the input shaft of the continuously variable transmission, and the in-gear state can be realized in the state in which the clutch of the forward/backward switching mechanism is engaged.

According to the invention, belt slippage can be reliably prevented and traveling performance can be prevented from deteriorating.

In the following, the embodiments of the invention will be described in detail with reference to the drawings. However, the components described in the following embodiments are merely examples, and the technical scope of the invention shall not be construed as being limited thereto.

1. Power Transmission System

Figure 2:
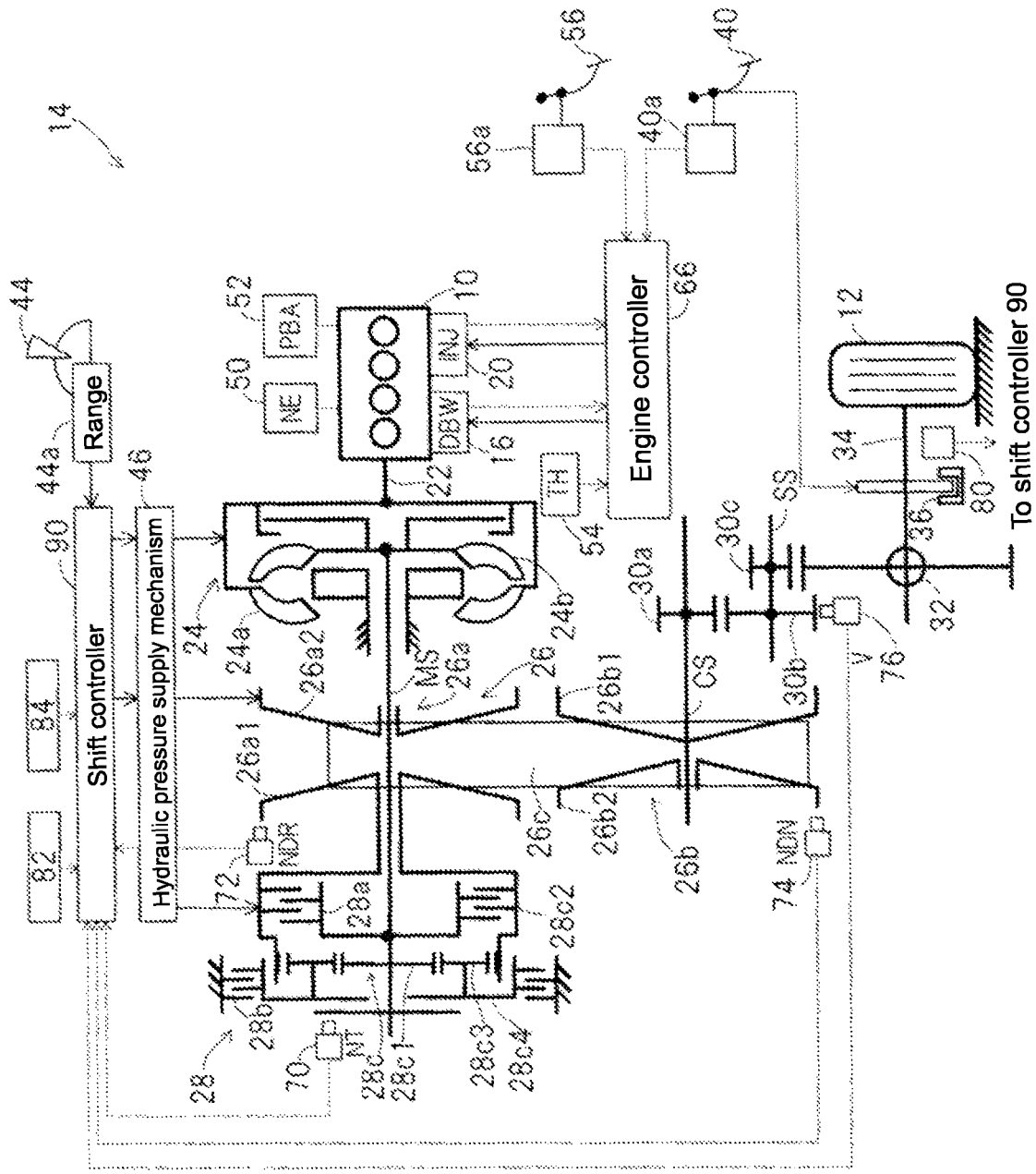
FIG. 2 is a schematic block diagram illustrating a power transmission system of a continuously variable transmission vehicle for which a lateral pressure control device according to an embodiment of the invention is suitable.

In FIG. 2, an engine 10 as a drive source is mounted in a continuously variable transmission vehicle 14 including a drive wheel 12. A throttle valve (not shown) provided in the intake system of the engine 10 is connected to a drive by wire (DBW) mechanism 16 including an actuator, such as an electric motor, and is opened and closed by the DBW mechanism 16.

The intake air modulated by the throttle valve flows through an intake manifold, mixes with fuel injected from an injector 20 (INJ) in the vicinity of the intake port of each cylinder to form mixed gas, and flows into the combustion chamber of the cylinder when the intake valve opens. In the combustion chamber, the mixed gas is ignited by the spark plug and combusted, drives the piston to rotate a crankshaft 22, becomes exhaust gas, and is discharged out of the engine 10.

The rotation of the crankshaft 22 is input to a CVT 26 via a torque converter 24 and a forward/backward switching mechanism 28. That is, the crankshaft 22 is connected to a pump impeller 24a of the torque converter 24, while a turbine runner 24b provided opposite thereto and receiving a fluid (hydraulic oil) is connected to a main shaft (input shaft) MS.

The CVT 26 which forms a continuously variable transmission includes the main shaft MS, more specifically a drive pulley 26a provided on an outer circumferential shaft thereof, a counter shaft (output shaft) CS parallel to the main shaft MS, more specifically a driven pulley 26b provided on an outer circumferential shaft thereof, and a power transmission element including an endless flexible member hung therebetween, such as a belt 26c made of metal.

The drive pulley 26a includes a fixed pulley half body 26a1, which is provided to be not movable in the axial direction and relatively not rotatable on the outer circumferential shaft of the main shaft MS, and a movable pulley half body 26a2 not relatively rotatable on the outer circumferential shaft of the main shaft MS and relatively movable in the axial direction with respect to the fixed pulley half body 26a1.

The driven pulley 26b includes a fixed pulley half body 26b1, which is provided to be not relatively rotatable on the outer circumferential shaft of the counter shaft CS and not movable in the axial direction, and a movable pulley half body 26b2 not relatively rotatable on the counter shaft CS and relatively movable in the axial direction with respect to the fixed pulley half body 26b1.

The forward/backward switching mechanism 28 includes a forward clutch 28a allowing the vehicle 14 to travel in the forward direction, a backward brake 28b allowing traveling in the backward direction, and a planetary gear mechanism 28c provided therebetween. The CVT 26 is connected to the engine 10 via the forward clutch 28a.

The forward clutch 28a and the backward brake 28b, more specially mainly the forward clutch 28a functions as a so-called torque fuse.

In the planetary gear mechanism 28c, a sun gear 28c1 is fixed to the main shaft MS, a ring gear 28c2 is fixed to the fixed pulley half body 26a1 of the drive pulley 26a via the forward clutch 28a.

A pinion 28c3 is provided between the sun gear 28c1 and the ring gear 28c2. The pinion 28c3 is connected to the sun gear 28c1 by using a carrier 28c4. When the backward brake 28b is operated, the carrier 28c4 is fixed (locked) accordingly.

The rotation of the counter shaft CS is transmitted from a secondary shaft (intermediate shaft) SS to the drive wheel 12 via a gear. That is, the rotation of the counter shaft CS is transmitted to the secondary shaft SS via gears 30a and 30b, and the rotation thereof is transmitted via a gear 30c from a differential 32 to the drive wheels 12 on the left and right (only the one on the right is shown) via the drive shaft 34.

Disc brakes 36 are provided in the vicinity of the four wheels including drive wheels (front wheels) and driven wheels (rear wheels, not shown), and a brake pedal 40 is provided on a vehicle driver seat floor.

The switching between the forward clutch 28a and the backward brake 28b in the forward/backward switching mechanism 28 is performed by the driver operating a range selector 44 provided at the vehicle driver seat to select one of the ranges (shift positions) such as P, R, N, D, etc. The range selection performed by the driver's operation of the range selector 44 is transmitted to a manual valve of a hydraulic pressure supply mechanism 46 to be described afterwards.

When the shift positions, such as D, S, L, are selected via the range selector 44, the spool of the manual valve moves correspondingly, and hydraulic oil (hydraulic pressure) is discharged from the piston chamber of the backward brake 28b, whereas the hydraulic pressure is supplied to the piston chamber of the forward clutch 28a to engage the forward clutch 28a.

When the forward clutch 28a is engaged, all the gears rotate integrally with the main shaft MS, and the drive pulley 26a is driven in the same direction (forward direction) with the main shaft MS. Accordingly, the vehicle 14 travels in the forward direction.

When the shift position of R is selected, hydraulic oil is discharged from the piston chamber of the forward clutch 28a, while the hydraulic pressure is supplied to the piston chamber of the backward brake 28b to operate the backward brake 28b. Accordingly, the carrier 28c4 is fixed and the ring gear 28c2 is driven in a direction opposite to the sun gear 28c1, the drive pulley 26a is driven in a direction (backward direction) opposite to the main shaft MS, and the vehicle 14 travels in the backward direction. In the following, a state in which either the forward clutch 28a or the backward brake 28b of the switching mechanism 28 is engaged is referred to as an in-gear state.

When the shift position of P or N is selected, hydraulic oil is discharged from the piston chambers of both the forward clutch 28a and the backward brake 28b, and the forward clutch 28a and the backward brake 28b are open, the power transmission via the forward/backward switching mechanism 28 is disconnected, and the power transmission between the engine 10 and the drive pulley 26a of the CVT 26 is cut off.

2. Hydraulic Pressure Supply Mechanism

Figure 3:
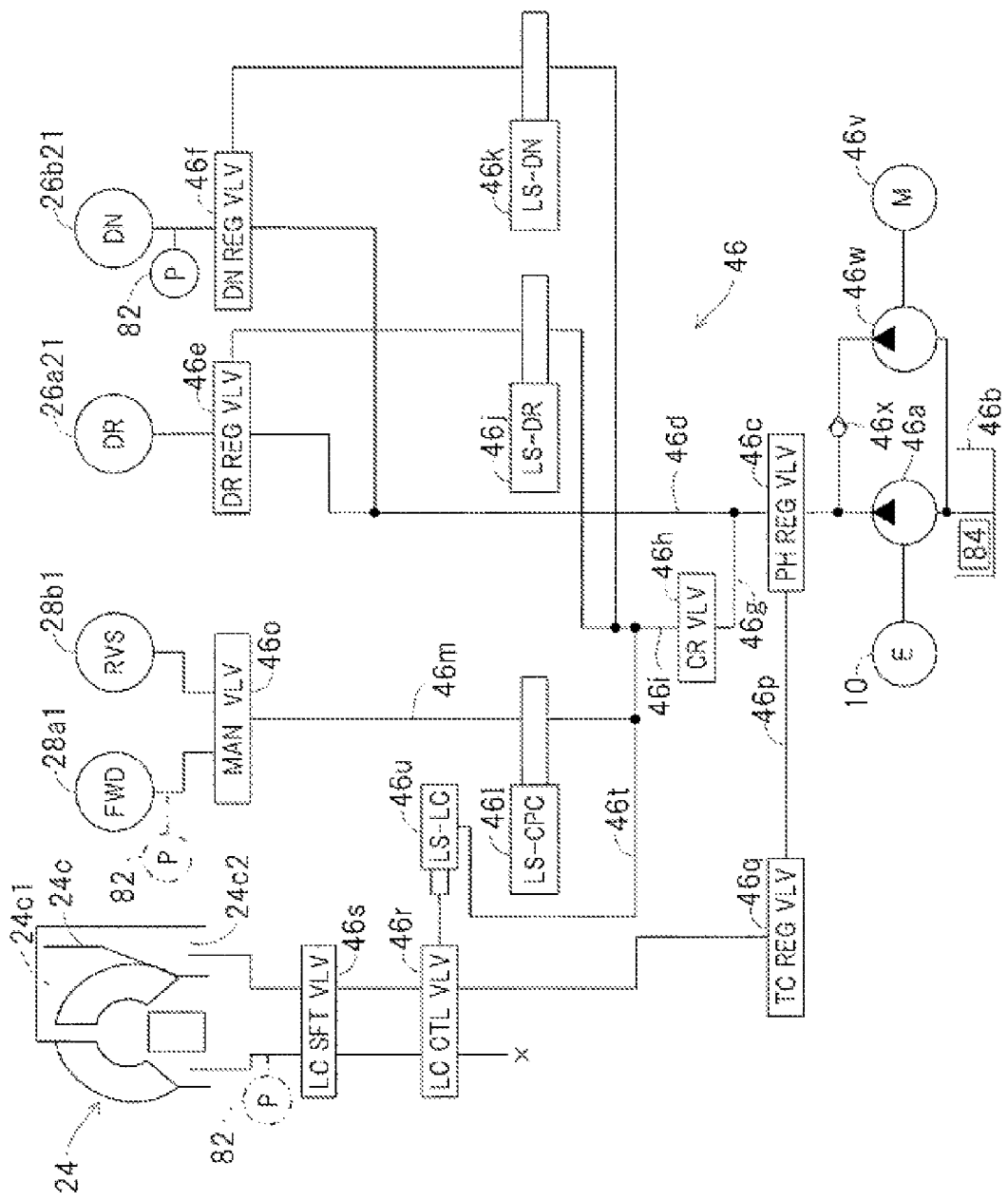
FIG. 3 is a hydraulic pressure circuit diagram illustrating an example of a hydraulic pressure supply mechanism of FIG. 1.

As shown in FIG. 3, a hydraulic pressure pump 46a is provided in the hydraulic pressure supply mechanism 46. The hydraulic pressure pump 46a includes a gear pump, is driven by the engine (E) 10, and pumps up the hydraulic oil stored in a reservoir 46b and to a PH control valve (PH REG VLV) 46c.

The output (PH pressure (line pressure)) of the PH control valve 46c, on the one hand, is connected to a piston chamber (DR) 26a21 of the movable pulley half body 26a2 of the drive pulley 26a and a piston chamber (DN) 26b21 of the movable pulley half body 26b2 of the driven pulley 26b of the CVT 26 from an oil passage 46d via first and second regulator valves (DR REG VLV, DN REG VLV) 46e and 46f; and, on the other hand, is connected to a CR valve (CR VLV) 46h via an oil passage 46g.

The CR valve 46h reduces the PH pressure to generate a CR pressure (control pressure), and supplies the CR pressure to first, second, and third (electromagnetic) linear solenoid valves 46j, 46k, and 46l (LS-DR, LS-DN, LS-CPC).

The first and second linear solenoid valves 46j and 46k apply output pressures determined in accordance with the excitation of the solenoids thereof to the first and second regulator valves 46e and 46f, and supply the hydraulic oil of the PH pressure transmitted from the oil passage 46d the piston chambers 26a21 and 26b21 of the movable pulley half bodies 26a2 and 26b2 accordingly, and thereby correspondingly generating pulley lateral pressures. Therefore, the first linear solenoid valve 46*j*, the first regulator valve 46*e*, the piston chamber 26*a*21, and the hydraulic pressure system thereof serve as a first lateral pressure generation circuit which generates a lateral pressure of the drive pulley 26*a*, and the second linear solenoid valve 46*k*, the second regulator valve 46*f*, the piston chamber 26*b*21, and the hydraulic pressure system thereof serve as a second lateral pressure generation circuit which generates a lateral pressure of the driven pulley 26*b*.

Accordingly, the pulley lateral pressures moving the movable pulley half bodies 26*a*2 and 26*b*2 in the axial direction are generated, the pulley widths of the drive pulley 26*a* and the driven pulley 26*b* change, and the winding radius of the belt 26*c* changes. Accordingly, by adjusting the pulley lateral pressures, a ratio (transmission ratio) of transmitting the output of the engine 10 to the drive wheel 12 can be changed steplessly.

The output (CR pressure) of the CR valve 46*h* is adjusted in accordance with the excitation of the solenoid of the third linear solenoid valve 46*l*, and is transmitted to the manual valve (MAN VLV) 46*o* via an oil passage 46*m*, and from there, the output is connected to a piston chamber (FWD) 28*a*1 of the forward clutch 28*a* and a piston chamber (RVS) 28*b*1 of the backward brake 28*b* of the forward/backward switching mechanism 28.

The manual valve 46*o*, as described above, connects the output of the CR valve 46*h* to either of the piston chambers 28*a*1 and 28*b*1 of the forward clutch 28*a* and the rearward brake 28*b* in accordance with the position of the range selector 44 operated (selected) by the driver.

In addition, the output of the PH control valve 46*c* is transmitted to a TC regulator valve (TC REG VLV) 46*q* via an oil passage 46*p*, and the output of the TC regulator valve 46*q* is connected to an LC shift valve (LC SFT VLV) 46*s* via an LC control valve (LC CTL VLV) 46*r*.//

The output of the LC shift valve 46*s*, on the one hand, is connected to a piston chamber 24*c*1 of a lockup clutch 24*c* of the torque converter 24 and, on the other hand, is connected to a chamber 24*c*2 on a back side thereof.

When the hydraulic oil is supplied to the piston chamber 24*c*1 via the LC shift valve 46*s* and discharged from the chamber 24*c*2 on the back side, the lockup clutch 24*c* is engaged (ON), and when the hydraulic oil is supplied to the chamber 24*c*2 on the back side and discharged from the piston chamber 24*c*1, the lockup clutch 24*c* is released (OFF). The slip amount of the lockup clutch 24*c* is determined by the amount of the hydraulic oil supplied to the piston chamber 24*c*1 and the chamber 24*c*2 on the back side.

The output of the CR valve 46*h* is connected to the LC control valve 46*r* and the LC shift valve 46*s* via an oil passage 46*t*, and a fourth linear solenoid valve (LS-LC) 46*u* is inserted on the oil passage 46*t*. The slip amount of the lockup clutch 24*c* is adjusted (controlled) by the excitation/non-excitation of the solenoid of the fourth solenoid valve 46*u*.

In addition, an electric oil pump (EOP) 46*w* connected to an electric motor 46*v* is connected to a position equivalent to downstream of the hydraulic pressure pump 46*a* and upstream of the PH control valve 46*c* via a check valve 46*x*.

Like the hydraulic pressure pump 46*a*, the EOP 46*w* also includes a gear pump, is driven by the electric motor 46*v*, and pumps up the hydraulic oil stored in the reservoir 46*b* and to the PH control valve (PH REG VLV) 46*c*.

The power transmission system including the torque converter 24, the CVT 26, and the forward/backward switching mechanism 28 can also be construed as a continuously variable transmission having the torque converter 24 and the forward/backward switching mechanism 28.

Referring to FIG. 2 again, a crank angle sensor 50 is provided at a suitable position in the vicinity of the cam shaft (not shown) of the engine 10, and outputs a signal indicating a rotation speed NE at each predetermined crank angle of the piston. An absolute pressure sensor 52 is provided at a suitable position downstream of the throttle valve in the intake system, and outputs a signal proportional to an absolute pressure (engine load) PBA in the intake pipe.

A throttle opening degree sensor 54 is provided in the actuator of the DBW mechanism 16, and outputs a signal proportional to a throttle valve opening degree TH through the rotation amount of the actuator.

In addition, an accelerator opening degree sensor 56*a* is provided in the vicinity of the accelerator pedal 56 and outputs a signal proportional to an accelerator opening degree AP equivalent to the accelerator pedal operation amount of the driver, and a brake switch 40*a* is provided in the vicinity of the brake pedal 40 and outputs an ON signal in accordance with the operation of the driver on the brake pedal 40.

In addition, a water temperature sensor (not shown) is provided in the vicinity of a cooling water passage (not shown) of the engine 10, and generates an output in accordance with an engine cooling water temperature TW, that is, the temperature of the engine 10.

The outputs of the crank angle sensor 50, etc., are transmitted to an engine controller 66. The engine controller 66 includes a microcomputer having a CPU, a ROM, a RAM, an I/O, etc., and, based on these sensor outputs, determines a target throttle opening degree to control the operation of the DBW mechanism 16 and determines the fuel injection amount to drive the injector 20.

An NT sensor (rotation speed sensor) 70 is provided on the main shaft MS, and outputs a pulse signal indicating the rotation speed of the turbine runner 24*b*, specifically the rotation speed NT of the main shaft MS, and more specifically the transmission input shaft rotation speed (and the input shaft rotation speed of the forward clutch 28*a*).

An NDR sensor (rotation speed sensor) 72 is provided at a suitable position in the vicinity of the drive pulley 26*a* of the CVT 26, and outputs a pulse signal in accordance with a rotation speed NDR of the drive pulley 26*a*, in other words the rotation speed of the output shaft of the forward clutch 28*a*.

An NDN sensor (rotation speed sensor) 74 is provided at a suitable position in the vicinity of the driven pulley 26*b*, and outputs a pulse signal indicating a rotation speed NDN of the driven pulley 26*b*, specifically the rotation speed of the counter shaft CS, and more specifically the rotation speed of the output shaft of the transmission.

In addition, a V sensor (rotation speed sensor) 76 is provided in the vicinity of the gear 30*b* of the secondary shaft SS, and outputs a pulse signal indicating the rotation speed and the rotation direction of the secondary shaft SS (specifically a signal indicating a vehicle speed V and a signal indicating the traveling direction). Wheel speed sensors 80 are respectively provided in the vicinity of the four wheels including the drive wheels 12 and the driven wheels (not shown), and output pulse signals proportional to the wheel speeds indicating the rotation speeds of the wheels.

A range selector switch 44*a* is provided in the vicinity of the range selector 44, and outputs a signal in accordance with the range, such as R, N, D, selected by the driver.

As shown in FIG. 3, a hydraulic pressure sensor 82 is provided on the oil passage to the driven pulley 26*b* of the CVT in the hydraulic pressure supply mechanism 46, and outputs a signal in accordance with the hydraulic pressure supplied to the piston chamber 26b21 of the movable pulley half body 26b2 of the driven pulley 26b. An oil temperature sensor 84 is provided in the reservoir 46b and outputs a signal in accordance with the oil temperature (temperature TATF of hydraulic oil ATF).

The outputs of the NT sensor 70, etc., including the outputs of other sensors not shown herein, are transmitted to the shift controller 90. The shift controller 90 includes a microcomputer having a CPU, a ROM, a RAM, an JO, etc., and is configured to be able to communicate with the engine controller 66.

The shift controller 90 excites/not excites the electromagnetic solenoids including the linear solenoid valves 46j and 46k (LS-DR, LS-DN) of the hydraulic pressure supply mechanism 46 based on the detected values to control the operations of the forward/backward switching mechanism 28, the CVT 26, and the torque converter 24, and supplies power to the electric motor 46v of the hydraulic pressure supply mechanism 46 to control the EOP 46w.

3. Control for Lateral Pressure Increase

Figure 4:
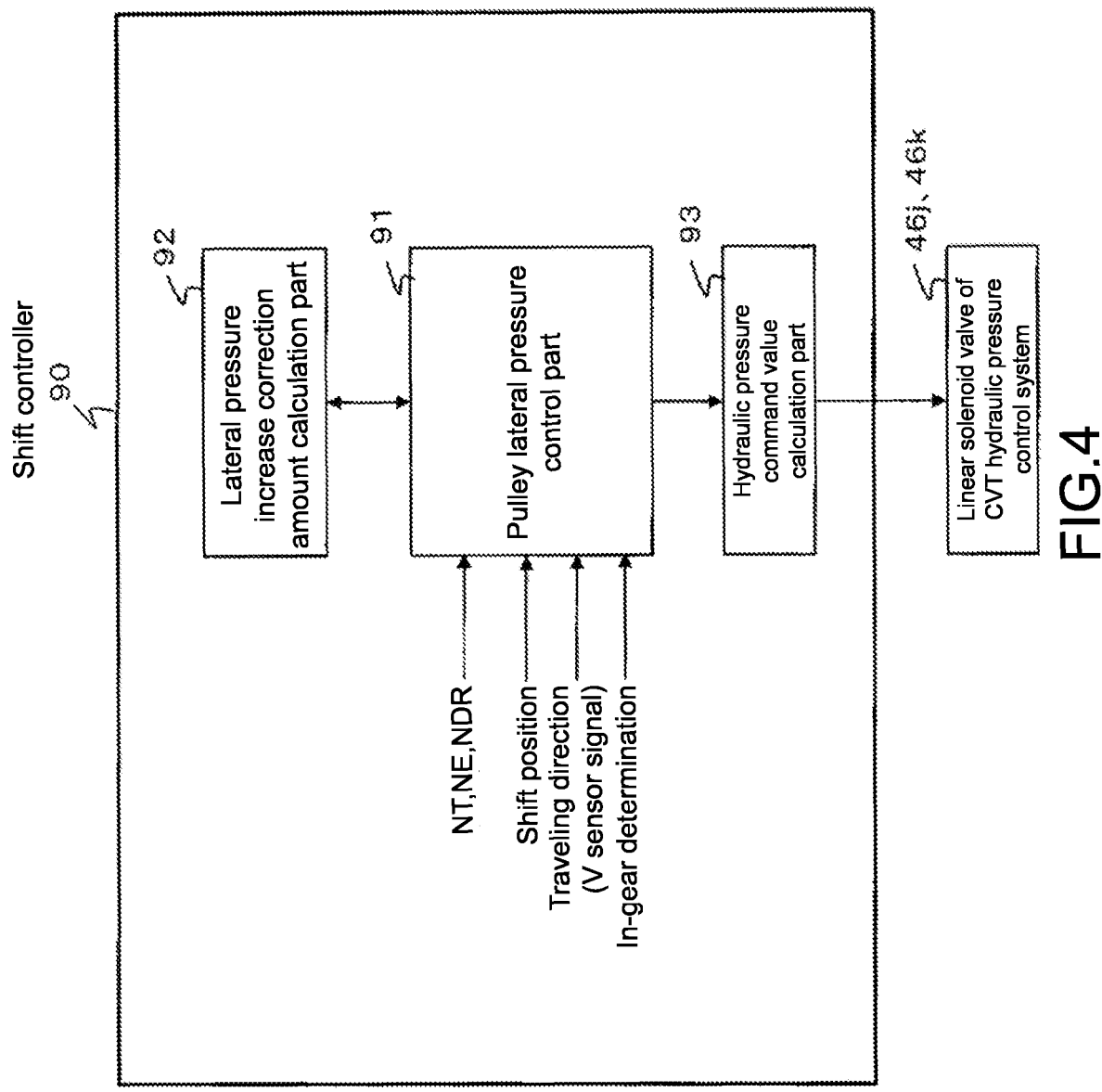
FIG. 4 is a block diagram illustrating a functional configuration of a lateral pressure control device according to the embodiment.

<Configuration>
As shown in FIG. 4, the lateral pressure control method (control method) of the CVT 26 according to the embodiment may be applied in the shift controller 90. The respective functions of a pulley lateral pressure control part 91, a lateral pressure increase correction amount calculation part 92, and a hydraulic pressure command value calculation part 93 to be described in the following can be realized by executing a program stored in a storage device not shown herein on a CPU.

In FIG. 4, the pulley lateral pressure control part 91 inputs a signal of the shift position selected by the range selector 44, an in-gear determination signal of whether the shift position D or R is selected and the clutch of the forward/backward switching mechanism 28 is in the in-gear state, a traveling direction determination signal indicating whether the rotation direction of the output shaft of the CVT 26 is the forward direction as detected from the V sensor, an engine rotation speed NE and an input rotation speed Ni of the CVT input to the torque converter 24. The pulley lateral pressure control part 91 calculates a slip rate ETR of the torque converter 24 to be described afterwards, and inputs a lateral pressure increase correction amount Δ in accordance with the properties of the torque converter 24 relating to the slip rate ETR from the lateral pressure increase correction amount calculation part 92. The lateral pressure increase correction amount Δ calculated by the lateral pressure increase correction amount calculation part 92 will be described afterwards.

The pulley lateral pressure control part 91 calculates the slip rate of the torque converter 24 from the engine rotation speed NE (the rotation speed of the pump impeller 24a of the torque converter 24) detected by the crank angle sensor 50, the rotation speed NT (the rotation speed of the turbine runner 24b of the torque converter 24) of the main shaft MS detected by the NT sensor 70 or the rotation speed NDR of the drive pulley 26 detected by the NDR sensor 72. For example, the slip rate ETR of the torque converter can be obtained from the following equation: ETR (%)=(NDR/NE) *100. In other words, the slip rate of the torque converter 24 is an example of an index indicating the rotation difference between the pump impeller 24a on the input side and the turbine runner 24b on the output side, whereas the absolute value of the rotation difference or the rotation speed may also be adopted. In the following, when the turbine runner 24b of the torque converter 24 rotates in the same direction with the pump impeller 24a, the torque converter slip rate ETR is set to be a positive value, and when the turbine runner 24b of the torque converter 24 rotates in the opposite direction, the value is set to be negative. When the turbine runner 24b rotates in the opposite direction with respect to the pump impeller 24a, the engine rotation speed NE is in a positive rotation direction, and the rotation speed NDR of the drive pulley 26a is in a negative rotation direction. Therefore, the smaller the negative value of the torque converter slip rate, that is, the closer the negative value to −1, the greater the absolute value of the rotation difference. In the following, the negative torque converter slip rate ETR is appropriately referred to as a reverse torque converter slip rate ETR. The reverse rotation of the torque converter 24 is detected as below.

The pulley lateral pressure control part 91 can determine whether the turbine runner 24b of the torque converter 24 is in positive rotation or reverse rotation by using the in-gear determination signal, the shift position, and the traveling direction determination signal. Referring to FIG. 2, in the case of the in-gear state in which the clutch of the forward/backward switching mechanism 28 is engaged, the rotation of the drive wheel 12 is transmitted to the main shaft MS and the turbine runner 24b via the CVT 26 and the forward/backward switching mechanism 28. Therefore, if the vehicle retreats in the in-gear state in which the shift position of Drive (D) is selected, the turbine runner 24b of the torque converter 24 rotates reversely with respect to the pump impeller 24a indicating the rotation of the engine 10. Thus, the in-gear determination signal, the shift position and the traveling direction determination signal are monitored, and when the shift position is inconsistent with the traveling direction are in the in-gear state, it can be determined that the torque converter 24 is reversed (see Japanese Laid-open No. 2010-078024).

When receiving the lateral pressure increase correction amount Δ from the lateral pressure increase correction amount calculation part 92, the pulley lateral pressure control part 91 performs lateral pressure increase control which adds the lateral pressure increase correction amount Δ, so as to warrant a lateral pressure capable of coping with foot variation torque in addition to the belt slip warranty pressure during normal traveling as described in the following, and outputs the result to the hydraulic pressure command value calculation part 93. The hydraulic pressure command value calculation part 93 calculates a hydraulic pressure command value from the lateral pressure increase result input from the pulley lateral pressure control part 91, and outputs the hydraulic pressure command value to the linear solenoid valves 46j and 46k (LS-DR, LS-DN) of the hydraulic pressure supply mechanism 46, respectively.

Figure 5:
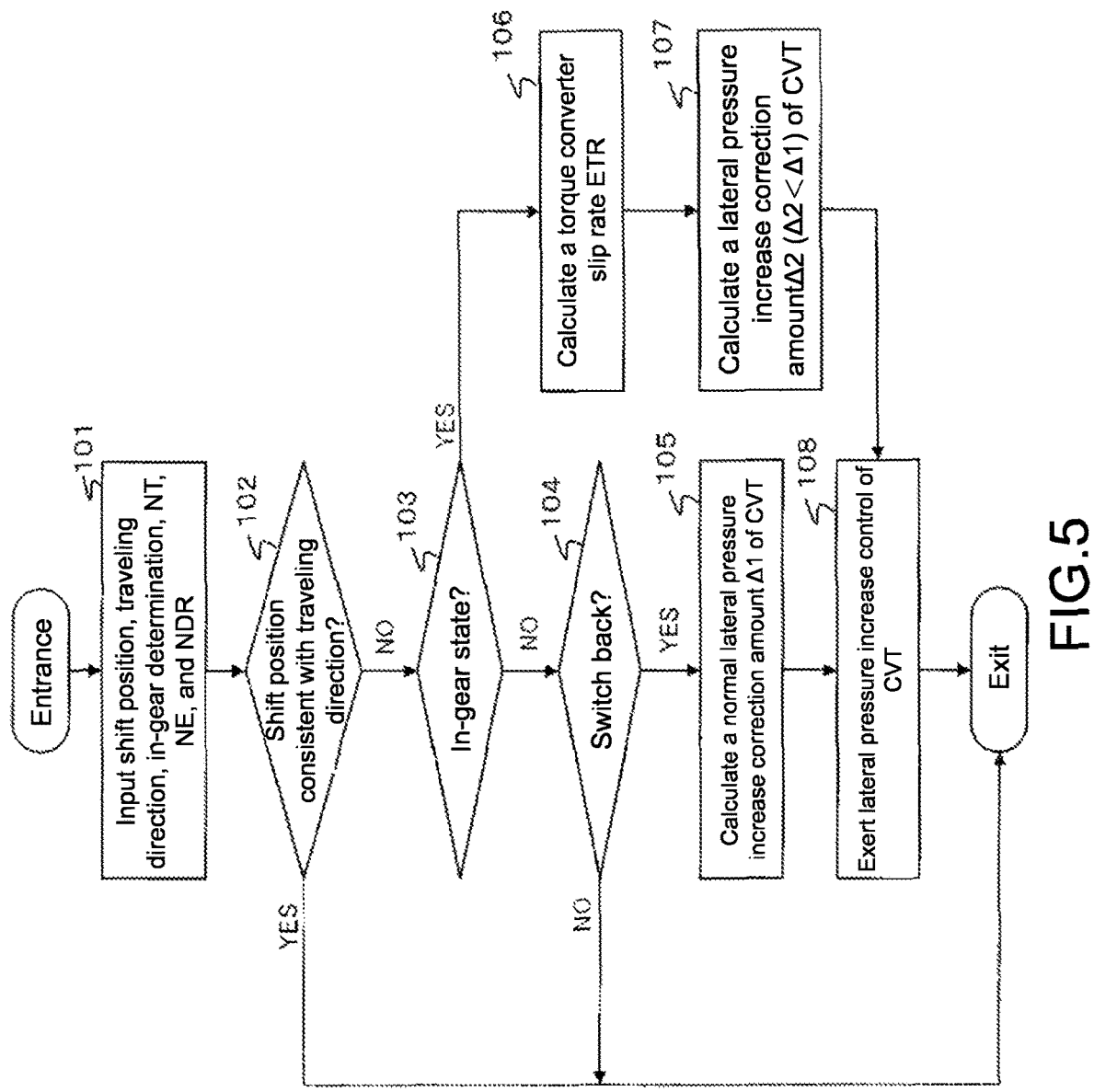
FIG. 5 is a flowchart illustrating an example of a lateral pressure control method according to the embodiment.

<Operation>
In FIG. 5, the pulley lateral pressure control part 91 inputs the shift position of the range selector 44, the traveling direction of the vehicle (the rotation direction detection signal of the V sensor 76), the in-gear determination signal indicating whether the forward/backward switching mechanism 28 is engaged, the engine rotation speed NE, the rotation speed NT of the main shaft MS, and the rotation speed NDR of the drive pulley 26a (Operation 101).

Then, the pulley lateral pressure control part 91 determines whether the shift position is consistent with the traveling direction (Operation 102). For example, if the vehicle travels forward at the shift position of Drive (D), the shift position is consistent with the traveling direction (YES), if the vehicle travels backward at the shift position of Drive (D), the shift position is not consistent with the traveling direction (NO), if the vehicle travels backward at the shift position of Reverse (R), the shift position is consistent with the traveling direction (YES), and if the vehicle travels forward at the shift position of Reverse (R), the shift position is not consistent with the traveling direction (NO). If the shift position is not consistent with the traveling direction (NO in Operation 102), whether the in-gear state is present is determined (Operation 103). Here, the in-gear state refers to a state in which one of the forward clutch or the backward brake of the forward/backward switching mechanism 28 is engaged. If the shift position is consistent with the traveling direction (Yes in Operation 102), the lateral pressure increase control ends.

If the in-gear state is not present (NO in Operation 103), the pulley lateral pressure control part 91 determines whether a switch-back operation is performed (Operation 104). If the switch-back operation is performed (YES in Operation 104), a lateral pressure increase correction amount Δ1 (first lateral pressure increase correction amount) corresponding to the clutch transmission torque is calculated (Operation 105). If the switch-back operation is not performed (NO in Operation 104), the lateral pressure increase control ends.

If the in-gear state is present (YES in Operation 103), the pulley lateral pressure control part 91 detects the reverse rotation of the torque converter 24, and calculates the torque converter slip rate ETR (Operation 106). The lateral pressure increase correction amount calculation part 92 uses the calculated torque converter slip rate ETR and the reverse properties of the torque converter 24 to calculate a lateral pressure increase correction amount Δ2 (second lateral pressure increase correction amount) (Operation 107). The lateral pressure increase correction amount Δ2, as will be described in the following, is set to a value smaller than the lateral pressure increase correction amount Δ1 of the clutch transmission torque according to the properties when the torque converter 24 is reversed. This is because, in the in-gear state, unlike the switch-back, there is no sudden increase in the inertial force when the forward/backward switching mechanism 28 is engaged (in-gear), and thus a lateral pressure capable of coping with the foot torque variation as described in the following is sufficient.

When the lateral pressure increase correction amount Δ of the drive pulley 26a and the driven pulley 26b is so calculated, the pulley lateral pressure control part 91 controls the linear solenoid valves 46j and 46k (LS-DR, LS-DN) of the hydraulic pressure supply mechanism 46 by the hydraulic pressure command value calculation part 93, and executes the lateral pressure increase control of the drive pulley 26a and the driven pulley 26b (Operation 108).

For example, if the vehicle travels backward in the in-gear state even if the shift position is at Drive (D) (NO in Operation 102 and YES in Operation 103), it is known that the vehicle is in the state of traveling reversely during uphill. If the vehicle is in the state of traveling reversely during uphill, the lateral pressure increase correction amount Δ is set to a value smaller than the clutch transmission torque according to the reverse property of the torque converter 24. Accordingly, the lateral pressure of the drive pulley 26a of the CVT 26 is less than the clutch transmission torque, the pressure difference in the case where the lateral pressure of the driven pulley 26b is increased to a predetermined value can be sufficiently increased, and the CVT 26 can maintain the transmission ratio at LOW. In the following, the process of calculating the lateral pressure increase correction amount Δ2 is described.

<Lateral Pressure Increase Correction Amount Δ2>

Figure 6:
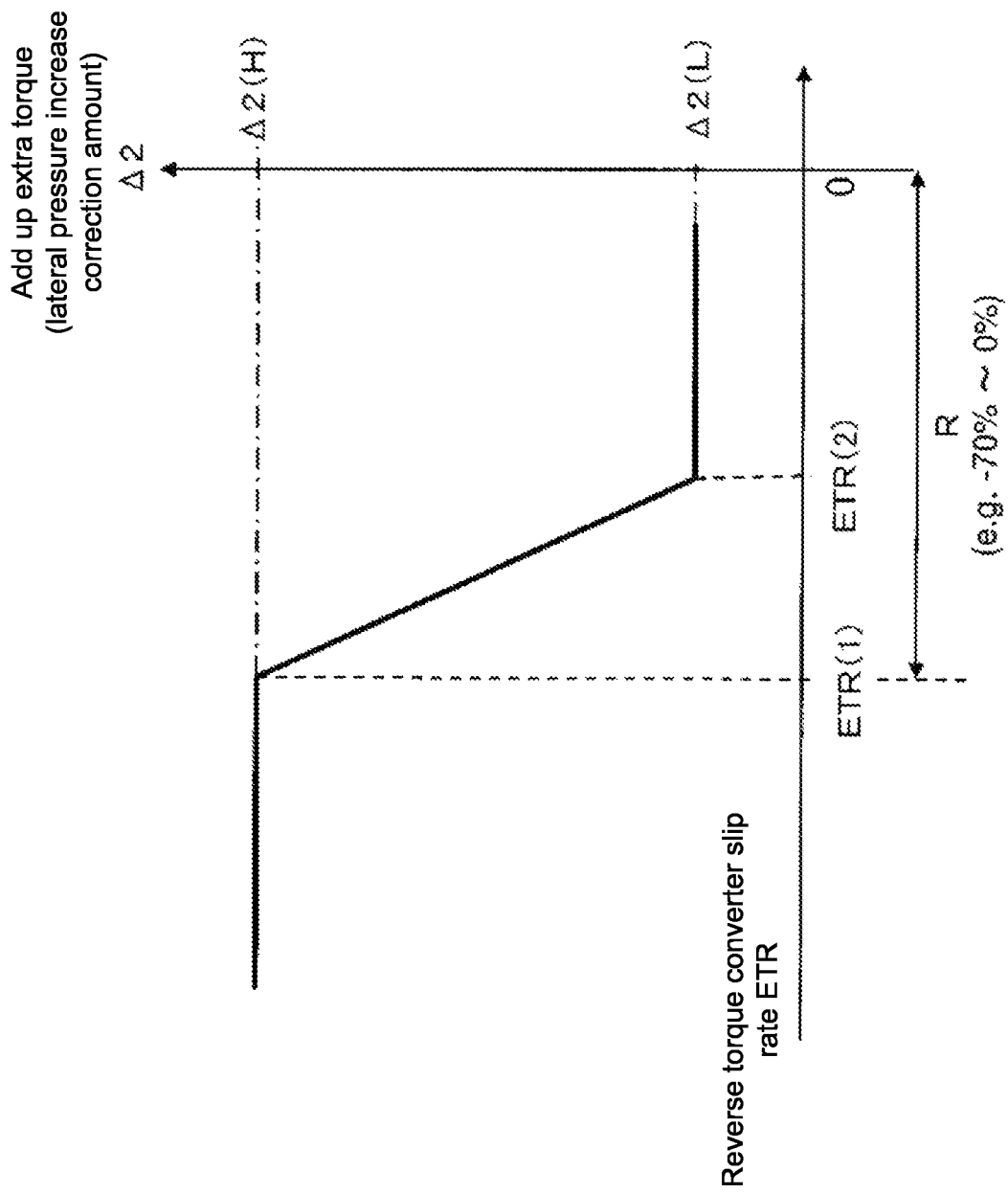
FIG. 6 is a graph illustrating a relation between a lateral pressure increase correction amount and a torque slip rate adopted in the lateral pressure control method according to the embodiment.

As shown in FIG. 6, the lateral pressure increase correction amount calculation part 92 decreases the size of the lateral pressure increase correction amount Δ2 as the reverse torque converter slip rate ETR increases within a predetermined range R (−70% to 0% in this example) of the reverse torque converter slip rate ETR. In this example, if the reverse torque converter slip rate ETR is less than equal to a predetermined value ETR(1)=−70%, the lateral pressure increase correction amount Δ2 is fixed to a highest value Δ2(H). The lateral pressure increase correction amount Δ2 decreases in accordance with the increase from ETR(1)=−70%, and decreases until being fixed to a lowest value Δ2(L) with a predetermined value ETR(2). The lateral pressure increase correction amount calculation part 92 has a function of returning the lateral pressure increase correction amount Δ2 corresponding to the reverse torque converter slip rate ETR applied from the pulley lateral pressure control part 91 to the pulley lateral pressure control part 91, and may maintain the relation shown in FIG. 6 as a table or as a formula.

As will be described in the following, the lateral pressure increase correction amount Δ2 changes so that the predetermined value ETR(2) and the lowest value Δ2(L) are set in accordance with a point at which the variation of the transmission torque (foot torque variation) starts increasing in the reverse properties of the torque converter 24, and the predetermined value ETR(1) and the highest value Δ2(H) are set in accordance with the highest amplitude of the foot torque variation, and a lateral pressure corresponding to the foot variation torque is warranted within the predetermined range R. In this way, according to the embodiment, in the case where the shift position is not consistent with the traveling direction in the in-gear state (e.g., the case where the torque converter slip rate ETR is negative at the time of traveling reversely during uphill), the lateral pressure increase correction amount Δ2 is changed as shown in FIG. 6 within the predetermined range R of the reverse torque converter slip rate ETR. In the following, the predetermined reverse torque converter slip rate ETR(1) is set to be −70% to describe the setting of the lateral pressure increase correction amount Δ2.

Figure 7:
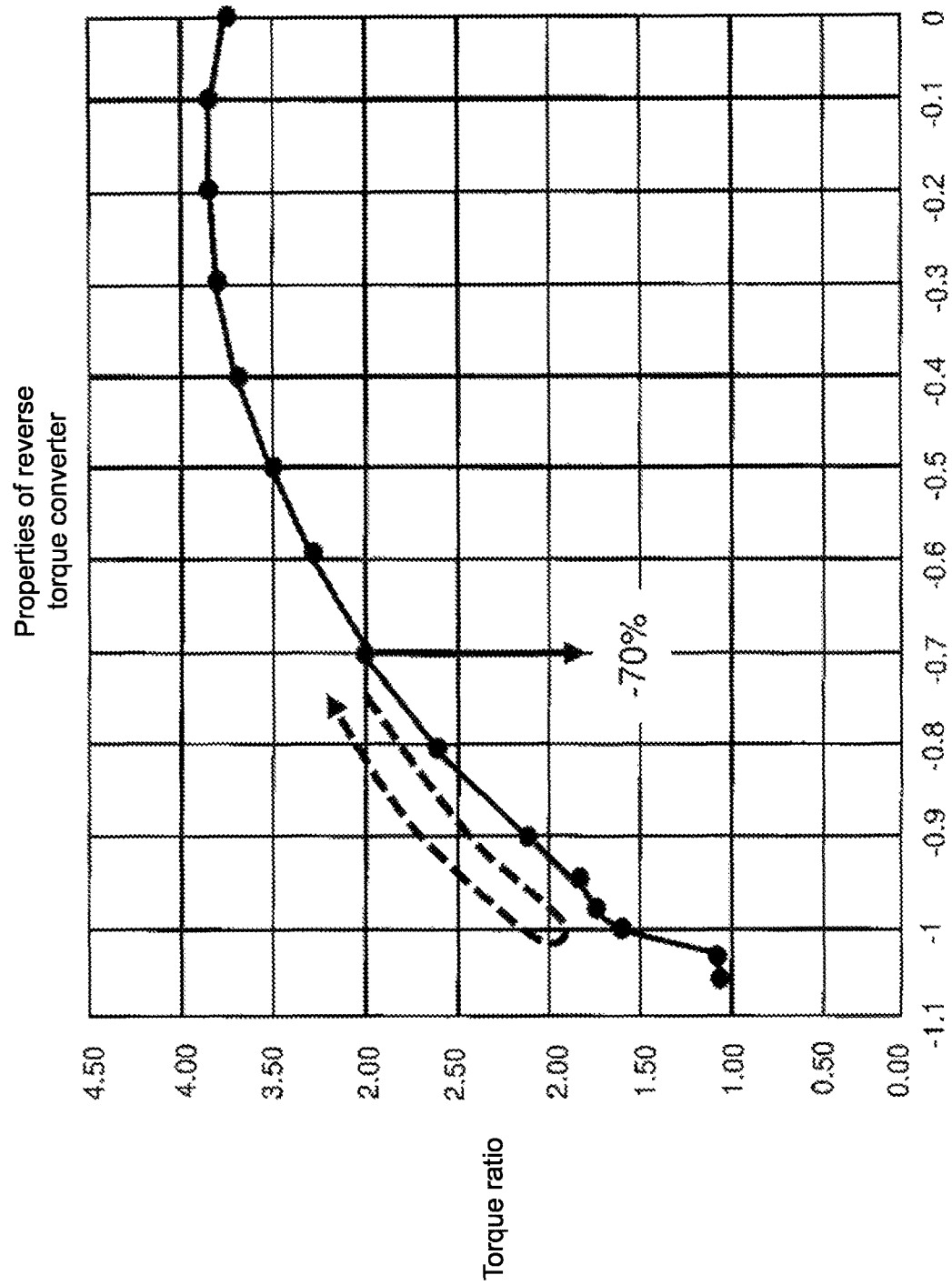
FIG. 7 is a graph illustrating an example of properties of a reverse torque converter.

As shown in FIG. 7, the reverse torque converter properties in the case where the pump impeller 24a and the turbine runner 24b of the torque converter 24 rotate in opposite directions exhibit a negative slope region in which the decrease rate of the torque ratio increases as the absolute value of the reverse torque converter slip rate ETR increases. On the contrary, in the case where the pump impeller 24a and the turbine runner 24b of the torque converter 24 rotate in the same direction, there is a positive slope region in which the decrease rate of the torque ratio decreases as the absolute value of the torque converter slip rate ETR increases. That is, the torque converter exhibits a property in which, regardless of the torque converter slip rate ETR being positive or negative, the smaller the absolute value of the torque converter slip rate ETR, the greater the amplification rate of the torque of the torque converter 24.

Figure 8:
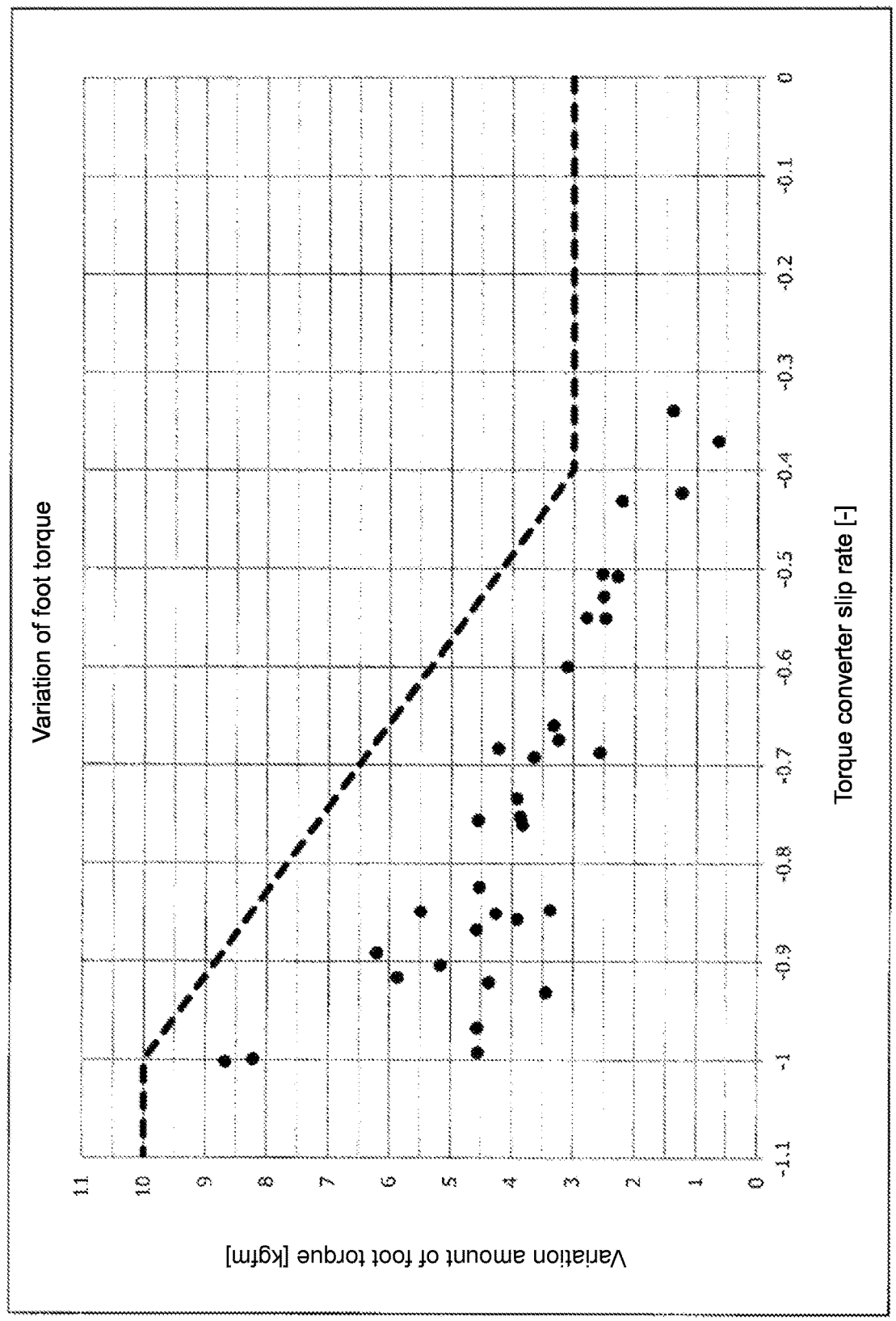
FIG. 8 is a graph for explaining foot torque variation.

For example, when the vehicle travels reversely during uphill until entering the negative slope region, the foot torque variation due to torque converter judder starts occurring, as shown in FIG. 8. Since the turbine of the torque converter 24 rotates in the opposite direction to the pump when the vehicle travels reversely during uphill, the rotation difference increases when the vehicle speed increases, and the rotation difference decreases when the vehicle speed decreases. Therefore, the foot torque variation shows a tendency of increasing as the vehicle speed increases and decreasing as the vehicle speed decreases. Here, the foot torque variation starts increasing when the reverse torque converter slip rate ETR becomes less than −70%. However, in the predetermined range R greater than −70%, the transmission torque transmitted from the torque converter 24 is smaller, and the torque variation is also smaller. Therefore, in the predetermined range R greater than −70%, as shown in FIG. 6, the lateral pressure increase correction amount Δ2 decreases in correspondence with the foot torque variation. Thus, in the in-gear state, since there is no sudden increase in the inertial force when the clutch of the forward/backward mechanism 28 is engaged, it suffices as long as a lateral pressure capable of coping with the foot torque variation is generated. Accordingly, as described in the following, even if the lateral pressure of the drive pulley 26a is relatively small, belt slippage is sufficiently warranted, and the transmission ratio of the CVT 26 can be kept LOW.

4. Operation Example

Figure 9:
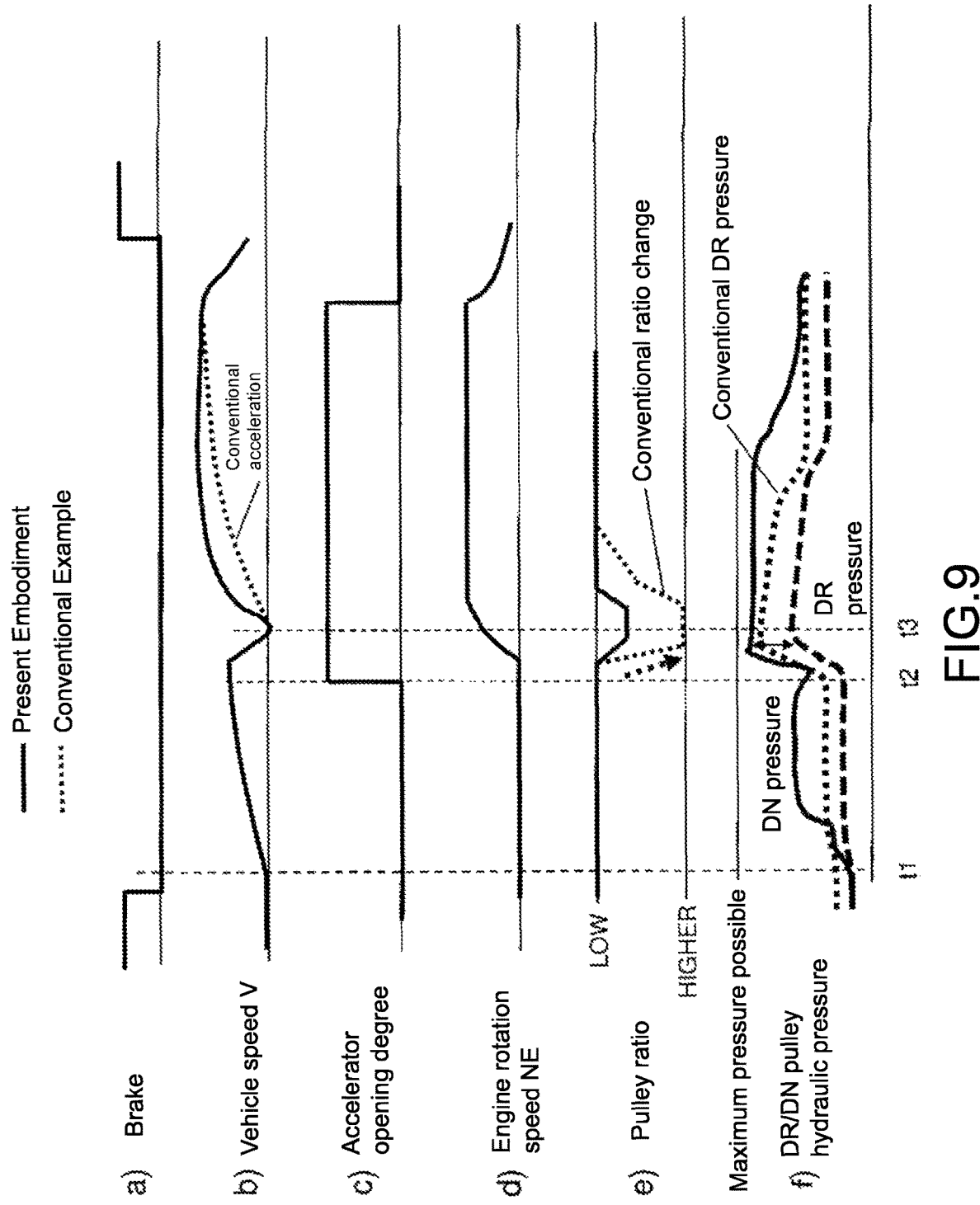
FIG. 9 is a time chart for explaining an operation of a continuously variable transmission vehicle in which the lateral pressure control device according to the embodiment is used from traveling reversely during uphill to restart.

Referring to FIG. 9, the operation of the drive system according to the embodiment is described by using the case (FIG. 1) in which the shift position is maintained at D while the vehicle restarts from traveling reversely during uphill as an example.

It is set that, when going uphill at the shift position of D (Drive), the brake is stepped on, and the vehicle 14 in which the CVT 26 is mounted stops. Then, the brake is released while the shift position stays at D (Drive), and at a time point t1, the vehicle 14 starts going backward ((a) and (b) of FIG. 9). At this time, the pulley ratio of the CVT 26 is LOW ((e) of FIG. 9). Since the vehicle 14 goes backward in a reverse direction with respect to the shift position of D in the in-gear state, the pulley lateral pressure control part 91 determines that the torque converter 24 is reversed, and performs control for increasing the lateral pressure of the driven pulley 26b, and performs control of increasing the lateral pressure applied to the drive pulley 26a by using the reverse torque converter slip rate ETR and the lateral pressure increase correction amount Δ2 calculated from the relation shown in FIG. 6.

The lateral pressure increase correction amount Δ2 is a value smaller than the lateral pressure increase correction amount Δ1 at the time of switch-back as described above. As shown in (f) of FIG. 9, the difference (DN–DR pressure difference) between the hydraulic pressure (DN pressure) of the driven pulley 26b and the hydraulic pressure (DR pressure) of the drive pulley 26a can be greater than the conventional DN–DR pressure difference.

At the time point t1 at which the brake is released, the vehicle speed of the vehicle 14 gradually increases, and the vehicle 14 travels backward ((b) of FIG. 9). At this time, if the accelerator pedal is stepped on at a time point t2 ((c) of FIG. 9), and the rotation speed NE of the engine 10 increases ((d) of FIG. 9), due to the in-gear state at the shift position of D, the drive force in the forward direction increases. Accordingly, after stopping (time point t3), the vehicle 14 starts moving forward (uphill). However, since the lateral pressure of the drive pulley 26a at this time is added with the relatively small lateral pressure increase correction amount Δ2, even if the lateral pressure of the driven pulley 26b is increased to the maximum pressure, the hydraulic pressure difference between the drive pulley 26a and the driven pulley 26b can still be greater than the conventional hydraulic pressure difference ((f) of FIG. 9). Therefore, the transmission ratio of the CVT 26 can be maintained to be near to LOW ((e) of FIG. 9), and a favorable uphill acceleration is obtained ((b) of FIG. 9).

5. Effects

As described above, according to the embodiment, in the case where the vehicle travels (reversely) in a direction opposite to the shift position in the in-gear state, the lateral pressure difference between the drive pulley 26a and the driven pulley 26b can be optimized, and the belt slip as well as the deviation of the transmission ratio from LOW can be prevented. In the following, the effect of the embodiment is described with reference to FIG. 10.

Figure 10:
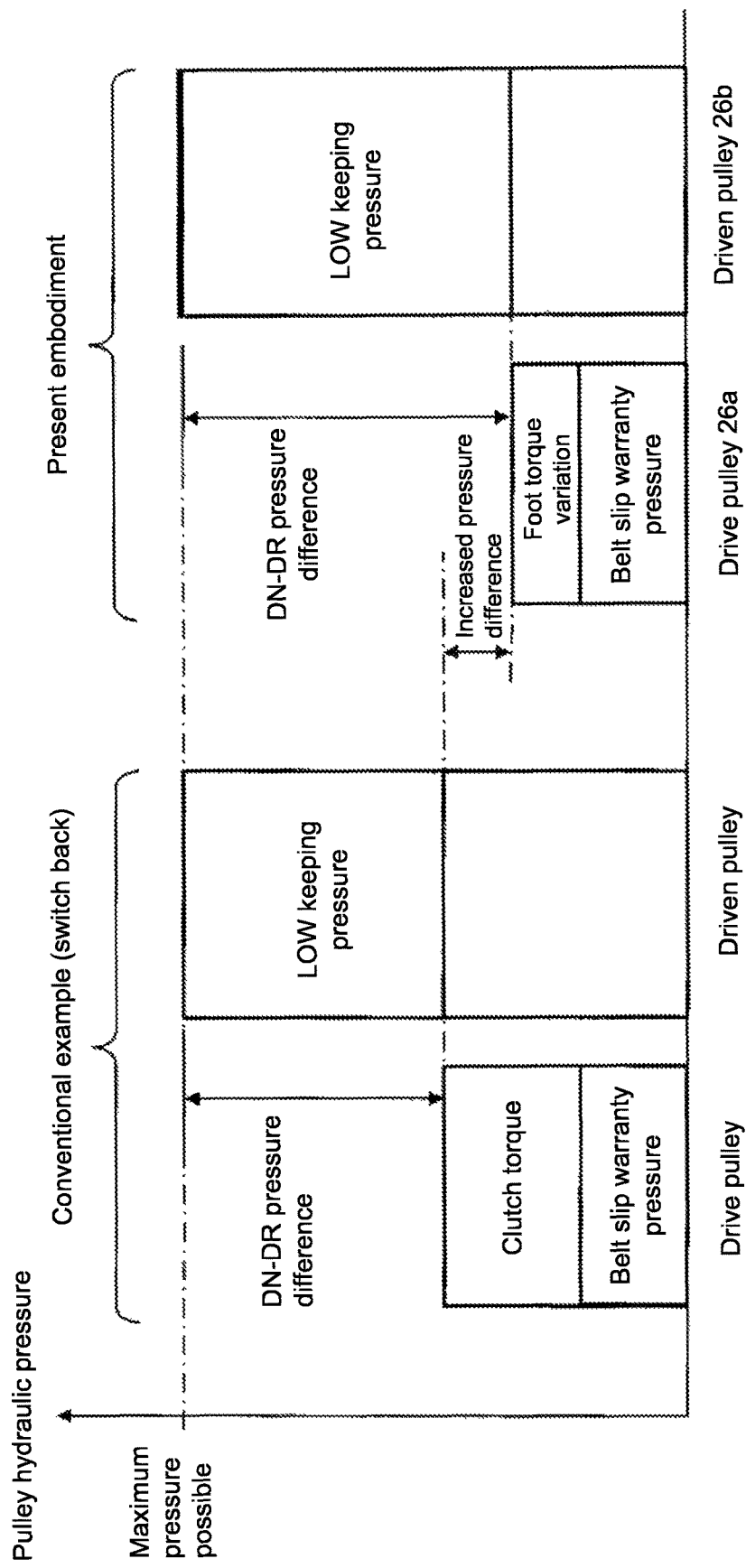
FIG. 10 is a bar graph comparing a conventional example and the embodiment regarding hydraulic pressures of a drive pulley and a driven pulley.

As shown in FIG. 10, since the switch-back operation in the conventional example is not in the in-gear state, by applying, to the drive pulley, a lateral pressure provided in the sudden increase of the inertial force when the clutch is engaged, belt slippage during reverse traveling is warranted. Therefore, in the case where the lateral pressure of the driven pulley is increased to the upper limit, when a high lateral pressure is applied to the drive pulley, it is possible that the hydraulic pressure difference (DN–DR pressure difference) between the driven pulley and the driven pulley is not sufficient. In the case where the backward-traveling vehicle stops and restarts by the accelerator operation while the shift position stays at Drive (D) in the in-gear state, as described in FIG. 1, the transmission ratio of the CVT cannot be kept at LOW. As a result, the uphill climbing performance is poor during re-acceleration from the reverse traveling during uphill.

Regarding this, according to the embodiment, when reverse traveling is detected in the in-gear state, the lateral pressure of the drive pulley 26a is increased by the lateral pressure increase correction amount Δ2 taking into consideration the foot torque variation, and the lateral pressure increase correction amount Δ2 is set to be smaller than the lateral pressure increase correction amount Δ1 provided under the assumption of switch-back. This is because, in the in-gear state, unlike the switch-back, there is no sudden increase in the inertial force when the clutch of the forward/backward switching mechanism 28 is engaged, and a lateral pressure capable of coping with the foot torque variation suffices. That is, with respect to the foot torque variation occurring during reverse traveling, belt slippage can be warranted with the lateral pressure increase correction amount Δ2 smaller than the lateral pressure increase correction amount Δ1. Accordingly, as shown in FIG. 9, in the case where the lateral pressure of the driven pulley 26b is increased to the upper limit, the hydraulic pressure difference (DN–DR pressure difference) between the drive pulley 26a and the driven pulley 26b can be increased. Therefore, even in the case where the backward-traveling vehicle stops and restarts by the accelerator operation while the shift position stays at Drive (D) in the in-gear state, as described in FIG. 1, belt slippage can be warranted, and the transmission ratio of the CVT 26 can be kept at LOW. That is, the belt 26c of the CVT 26 can be reliably protected without deteriorating traveling performance, and the driver's discomfort can be eliminated.

According to the embodiment, the lateral pressure increase correction amount Δ2 at the time during reverse traveling in the in-gear state is calculated based on the reverse torque converter properties of the torque converter 24. For example, the foot torque variation decreases within the predetermined range R where the torque converter slip rate ETR of the reverse torque properties is greater than the predetermined value (−70%), and the foot torque variation increases within the range smaller than the predetermined value (−70%). By using this phenomenon, the greater the reverse slip rate ETR within the predetermined range R, the smaller the lateral pressure increase correction amount Δ2 can be than the lateral pressure increase correction amount Δ1 at the time of switch-back. Accordingly, the hydraulic pressure difference (DN−DR pressure difference) between the drive pulley 26a and the driven pulley 26b is increased, and, as described above, even in the case of restarting from reverse traveling in the in-gear state, it is possible to warrant belt slippage and keep the transmission ratio of the CVT 26 at LOW.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A control device of a continuously variable transmission, which is a lateral pressure control device of the continuously variable transmission in a vehicle in which the continuously variable transmission is mounted, wherein the continuously variable transmission comprises a drive pulley, a driven pulley, and a belt wound on the drive pulley and the driven pulley, a transmission ratio is changed by changing groove widths of the drive pulley and the driven pulley, and a drive force from a drive source is transmitted to a wheel, the control device having:
   a first lateral pressure generation circuit, generating a lateral pressure of the drive pulley;
   a second lateral pressure generation circuit, generating a lateral pressure of the driven pulley; and
   a control part controlling the first lateral pressure generation circuit and the second lateral pressure generation circuit and controlling the respective lateral pressures of the drive pulley and the driven pulley,
   wherein the controller is configured to:
      in a case where the continuously variable transmission is not in an in-gear state and a shift position is inconsistent with a traveling direction of the vehicle, set an increase correction amount of the lateral pressure of the drive pulley to a first lateral pressure increase correction amount, and
      in a case where the continuously variable transmission is in the in-gear state and the shift position is not consistent with the traveling direction of the vehicle, set the increase correction amount of the lateral pressure of the drive pulley to a second lateral pressure increase correction amount,
   the second lateral pressure increase correction amount being smaller than the first lateral pressure increase correction amount.

2. The control device of the continuously variable transmission as claimed in claim 1, further comprising a torque converter provided between an output shaft of the drive source and an input shaft of the continuously variable transmission,
   wherein the control part is configured to:
      in the case where the continuously variable transmission is in the in-gear state and the shift position is not consistent with the traveling direction of the vehicle, calculate a rotation difference between an input side and an output side of the torque converter, and
      generate the second lateral pressure increase correction amount in accordance with the rotation difference, wherein the greater the rotation difference, the greater the second lateral pressure increase correction amount.

3. The control device of the continuously variable transmission as claimed in claim 2, further comprising a forward/backward switching mechanism provided between the torque converter and the input shaft of the continuously variable transmission, wherein the in-gear state is a state in which a clutch of the forward/backward switching mechanism is engaged.

4. A control method of a continuously variable transmission, which is a lateral pressure control method of the continuously variable transmission in a vehicle in which the continuously variable transmission is mounted, wherein the continuously variable transmission comprises a drive pulley, a driven pulley, and a belt wound on the drive pulley and the driven pulley, a transmission ratio is changed by changing groove widths of the drive pulley and the driven pulley, and a drive force from a drive source is transmitted to a wheel, the control method comprising:
   by a control part controlling respective lateral pressures of the drive pulley and the driven pulley,
      detecting an in-gear state of the continuously variable transmission, a shift position, and a traveling direction of the vehicle;
      in a case where the continuously variable transmission is not in the in-gear state and the shift position is not consistent with the traveling direction of the vehicle, setting an increase correction amount of the lateral pressure of the drive pulley to a first lateral pressure increase correction amount; and
      in a case where the continuously variable transmission is in the in-gear state and the shift position is not consistent with the traveling direction of the vehicle, setting the increase correction amount of the lateral pressure of the drive pulley to a second lateral pressure increase correction amount,
   the second lateral pressure increase correction amount being smaller than the first lateral pressure increase correction amount.

5. The control method of the continuously variable transmission as claimed in claim 4, wherein the vehicle further comprises a torque converter provided between an output shaft of the drive source and an input shaft of the continuously variable transmission,
   wherein the control part is configured to:
      in the case where the continuously variable transmission is in the in-gear state and the shift position is not consistent with the traveling direction of the vehicle, calculate a rotation difference between an input side and an output side of the torque converter, and
      generate the second lateral pressure increase correction amount in accordance with the rotation difference,
   wherein the greater the rotation difference, the greater the second lateral pressure increase correction amount.

6. The control method of the continuously variable transmission as claimed in claim 5, wherein the vehicle further comprises a forward/backward switching mechanism provided between the torque converter and the input shaft of the continuously variable transmission, and the in-gear state is a state in which a clutch of the forward/backward switching mechanism is engaged.

* * * * *